US011242637B2

(12) United States Patent
Assis et al.

(10) Patent No.: US 11,242,637 B2
(45) Date of Patent: Feb. 8, 2022

(54) SUSPENSION SYSTEM

(71) Applicant: WHIRLPOOL CORPORATION, Benton Harbor, MI (US)

(72) Inventors: Clóvis Douglas Minchola de Assis, Rio Claro (BR); Afrânio Berti Chinchilha, Rio Claro (BR); Thiago Vianna Galavotti, Rio Claro (BR); Blessing Chidinma Ifekaibeya, Campinas (BR)

(73) Assignee: Whirlpool Corporation, Benton Harbor, MI (US)

( * ) Notice: Subject to any disclaimer, the term of this patent is extended or adjusted under 35 U.S.C. 154(b) by 151 days.

(21) Appl. No.: 16/701,631

(22) Filed: Dec. 3, 2019

(65) Prior Publication Data
US 2021/0164146 A1 Jun. 3, 2021

(51) Int. Cl.
*D06F 37/24* (2006.01)
*D06F 37/26* (2006.01)
*F16C 11/06* (2006.01)

(52) U.S. Cl.
CPC ............ *D06F 37/24* (2013.01); *D06F 37/268* (2013.01); *F16C 11/06* (2013.01); *F16C 11/0614* (2013.01)

(58) Field of Classification Search
CPC ........ D06F 37/24; D06F 37/267; F16C 11/06; F16C 11/0614
See application file for complete search history.

(56) References Cited

U.S. PATENT DOCUMENTS

| | | | |
|---|---|---|---|
| 5,117,659 A * | 6/1992 | Sharp | D06F 37/24 68/23.3 |
| 9,297,104 B2 | 3/2016 | Wong et al. | |
| 9,725,842 B2 | 8/2017 | Davis | |
| 9,994,989 B2 | 6/2018 | Coxon | |
| 2011/0037359 A1* | 2/2011 | Munhoz | D06F 37/24 312/228 |
| 2011/0167878 A1 | 7/2011 | De Angelo Sanchez et al. | |
| 2014/0367536 A1* | 12/2014 | Wong | D06F 37/20 248/176.1 |
| 2016/0305057 A1* | 10/2016 | Coxon | F16C 11/068 |
| 2018/0163335 A1* | 6/2018 | Lv | D06F 39/00 |
| 2018/0371676 A1 | 12/2018 | Higuchi | |
| 2019/0003101 A1* | 1/2019 | Lv | D06F 34/16 |
| 2020/0056316 A1* | 2/2020 | Lv | D06F 37/20 |

* cited by examiner

*Primary Examiner* — Joseph L. Perrin
(74) *Attorney, Agent, or Firm* — Price Heneveld LLP

(57) ABSTRACT

A laundry appliance includes a cabinet frame that defines a receiving aperture. A tub is disposed within the cabinet frame. A suspension support includes an engagement portion. The engagement portion includes an ejection surface sloping in a first direction and an assembling surface sloping in a second opposing direction to a retaining notch. A suspension rod extends between the tub and the suspension support and has a hook for selectively engaging the assembling surface in an installed position and selectively engaging the ejection surface in a misaligned position.

20 Claims, 12 Drawing Sheets

SUSPENSION SYSTEM

BACKGROUND OF THE DISCLOSURE

The present disclosure generally relates to a suspension system, and more specifically, to a suspension system for a laundry appliance.

SUMMARY OF THE DISCLOSURE

According to one aspect of the present disclosure, a laundry appliance includes a cabinet frame that defines a receiving aperture. A tub is disposed within the cabinet frame. A suspension support includes an engagement portion. The engagement portion includes an ejection surface sloping in a first direction and an assembling surface sloping in a second opposing direction to a retaining notch. A suspension rod extends between the tub and the suspension support and has a hook for selectively engaging the assembling surface in an installed position and selectively engaging the ejection surface in a misaligned position.

According to another aspect of the present disclosure, a suspension system for a laundry appliance includes a suspension rod having a hook with an end. A suspension support has an ejection surface sloping in a first direction to a disengaging exit path and an assembling surface sloping in a second opposing direction to a retaining notch. When the hook engages the ejection surface, the hook is configured to slide along the ejection surface to the disengaging exit path and when the hook engages the assembling surface, the hook is configured to slide along the assembling surface to position the end of the hook in the retaining notch.

According to yet another aspect of the present disclosure, a suspension support includes a base. An engagement portion includes an ejection surface sloping in a first direction. The ejection surface is divided by a channel that defines a disengaging exit path. An engagement portion includes an assembling surface sloping in a second opposing direction. The assembling surface is divided by a retention feature. A retaining notch is defined by at least one of the base and the engagement portion proximate the retention feature.

These and other features, advantages, and objects of the present disclosure will be further understood and appreciated by those skilled in the art by reference to the following specification, claims, and appended drawings.

Figure 1:
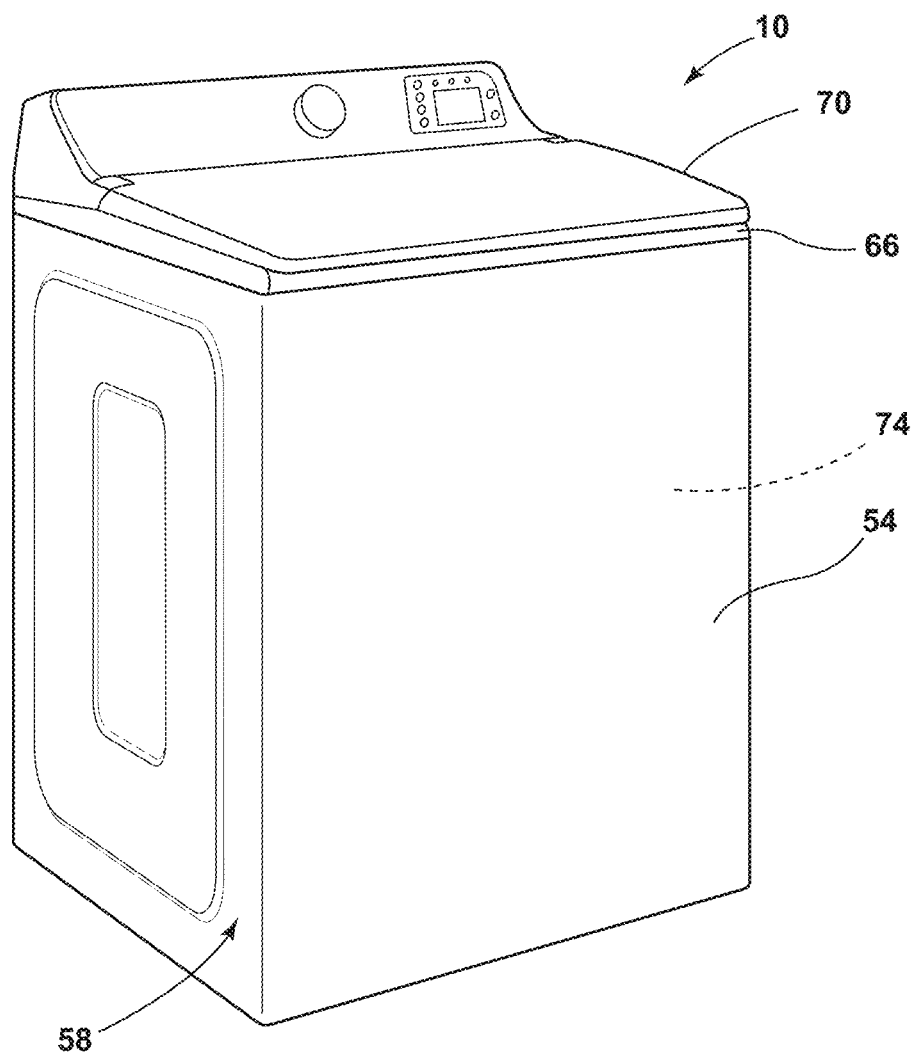
FIG. 1 is a top perspective view of a laundry appliance, according to the present disclosure.

The components in the figures are not necessarily to scale, emphasis instead being placed upon illustrating the principles described herein.

DETAILED DESCRIPTION

The present illustrated embodiments reside primarily in combinations of method steps and apparatus components related to a suspension system for a laundry appliance. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring to FIGS. 1-12, reference numeral 10 generally designates a laundry appliance that includes a cabinet frame 14 that defines a receiving aperture 18. A tub 22 is disposed within the cabinet frame 14. A suspension support 26 includes an engagement portion 30. The engagement portion 30 includes an ejection surface 34 sloping in a first direction and an assembling surface 38 sloping in a second opposing direction to a retaining notch 42. A suspension rod 46 extends between the tub 22 and the suspension support 26 and has a hook 50 that selectively engages the assembling surface 38 in an installed position 40 and selectively engages the ejection surface 34 in a misaligned position.

Figure 2:
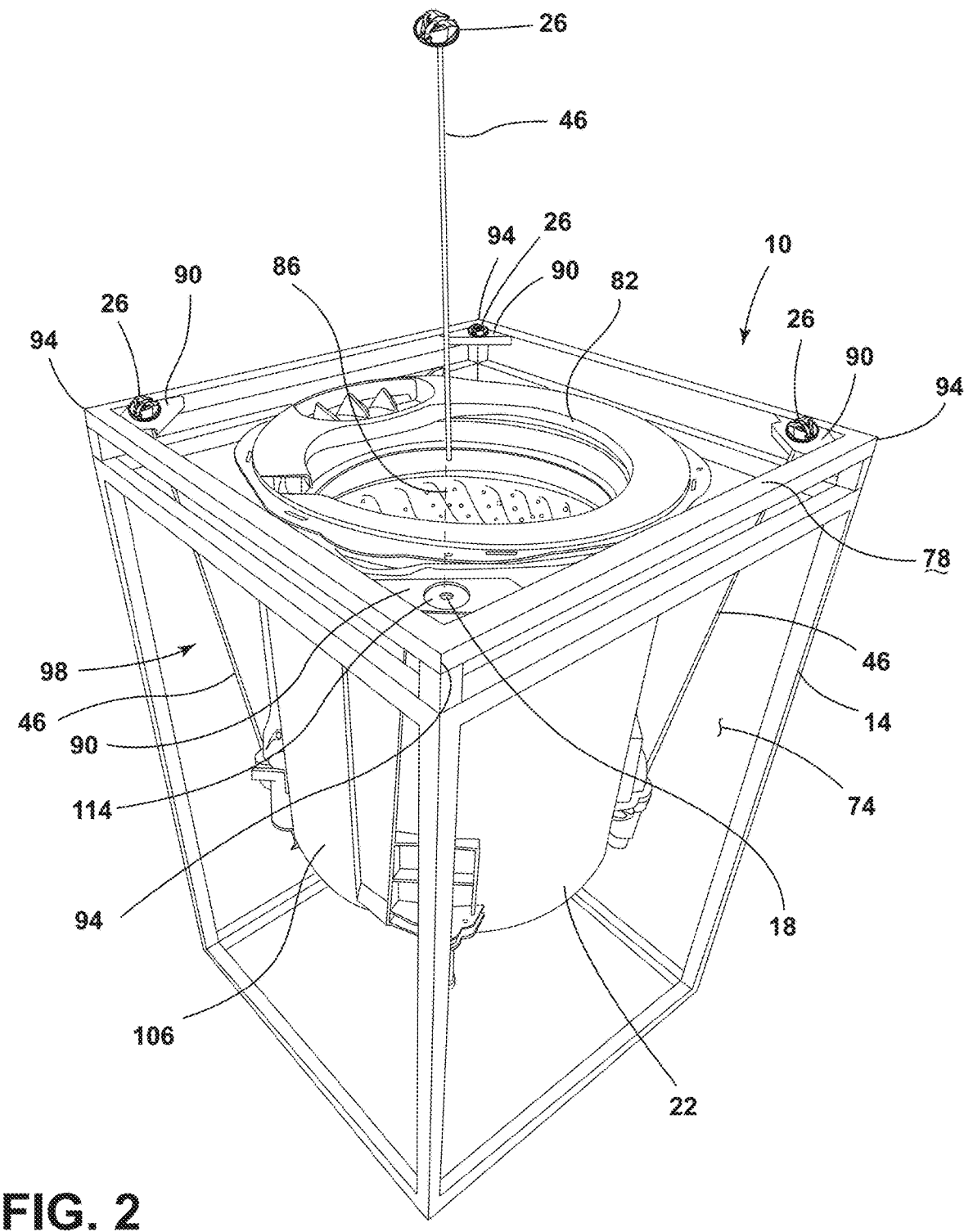
FIG. 2 is a top perspective view of a suspension system supporting a tub of the laundry appliance of FIG. 1.

Referring to FIGS. 1 and 2, the laundry appliance 10 is illustrated as a top-load washer. The laundry appliance 10 includes a cabinet 54 having a plurality of panels 58. The plurality of panels 58 extend around the cabinet frame 14 to define the cabinet 54. A door 70 is rotatably coupled with a top panel 66 for selectively sealing and providing access to the tub 22 disposed within an interior cavity 74 of the cabinet 54. The top panel 66 is configured to be disposed over an upper surface 78 of the cabinet frame 14 and can conceal the upper surface 78 of the cabinet frame 14 from view of a user. An access opening defined in the top panel 66 aligns with a tub opening 82 to provide access to a drum 86 disposed within the tub 22.

The laundry appliance 10 includes brackets 90 coupled to the cabinet frame 14 near the upper surface 78. As illustrated in FIG. 2, the laundry appliance 10 includes four brackets 90, where each bracket 90 is disposed proximate a corresponding corner 94 of the cabinet frame 14. The laundry appliance 10 includes a suspension system 98 for supporting the tub 22 within the cabinet 54. The suspension system 98 includes suspension rods 46 that each engage a corresponding suspension support 26. As illustrated in FIG. 2, the suspension system 98 includes four suspension rods 46 that each engage one of four suspension supports 26. The suspension supports 26 are each disposed within the receiving aperture 18 (FIG. 3) defined by a corresponding bracket 90. In this way, each corner 94 of the cabinet frame 14 includes the suspension support 26. In various examples, the suspension rods 46 each extend between a lower portion 106 of the tub 22 and the corresponding suspension support 26. The suspension rods 46 support the tub 22 within the cabinet 54 while allowing independent movement of the tub 22 relative to the cabinet 54.

Figure 3:
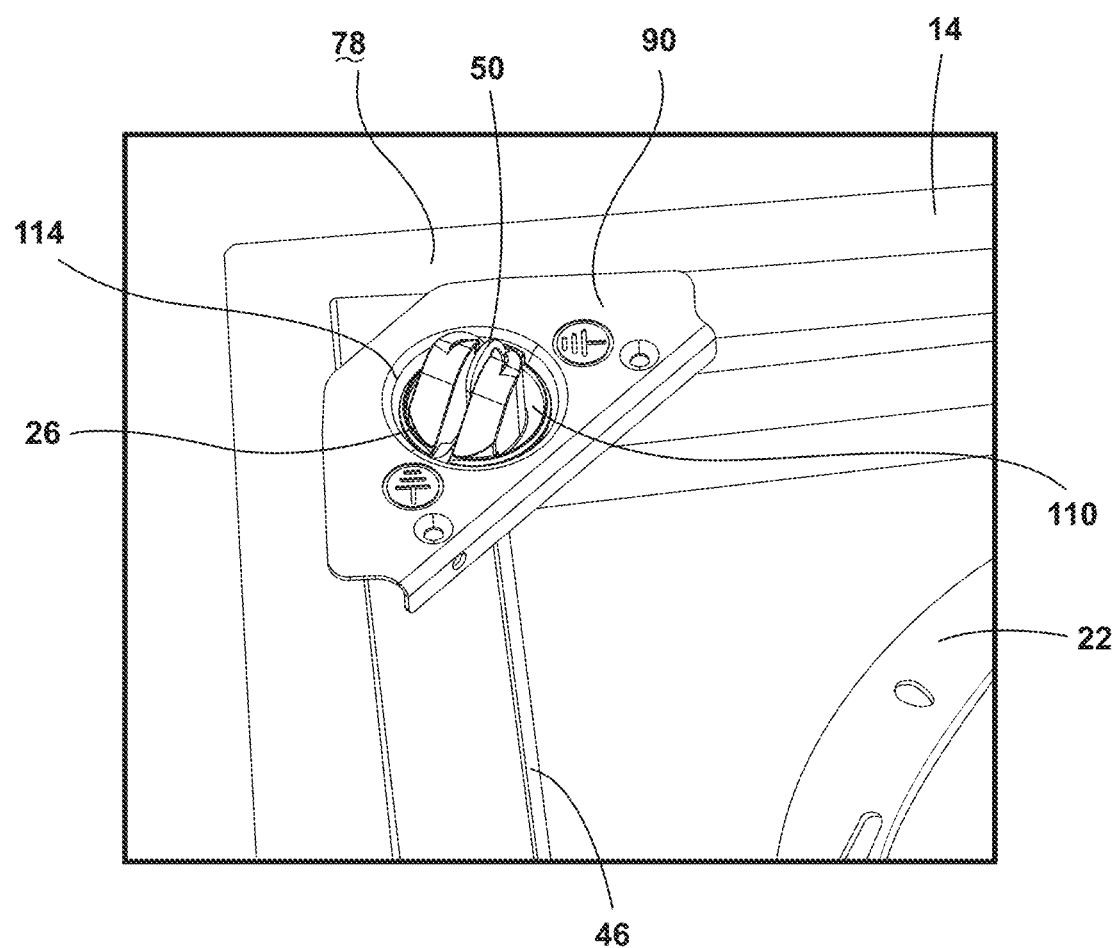
FIG. 3 is a partial top perspective view of the suspension system of FIG. 2.
Figure 4:
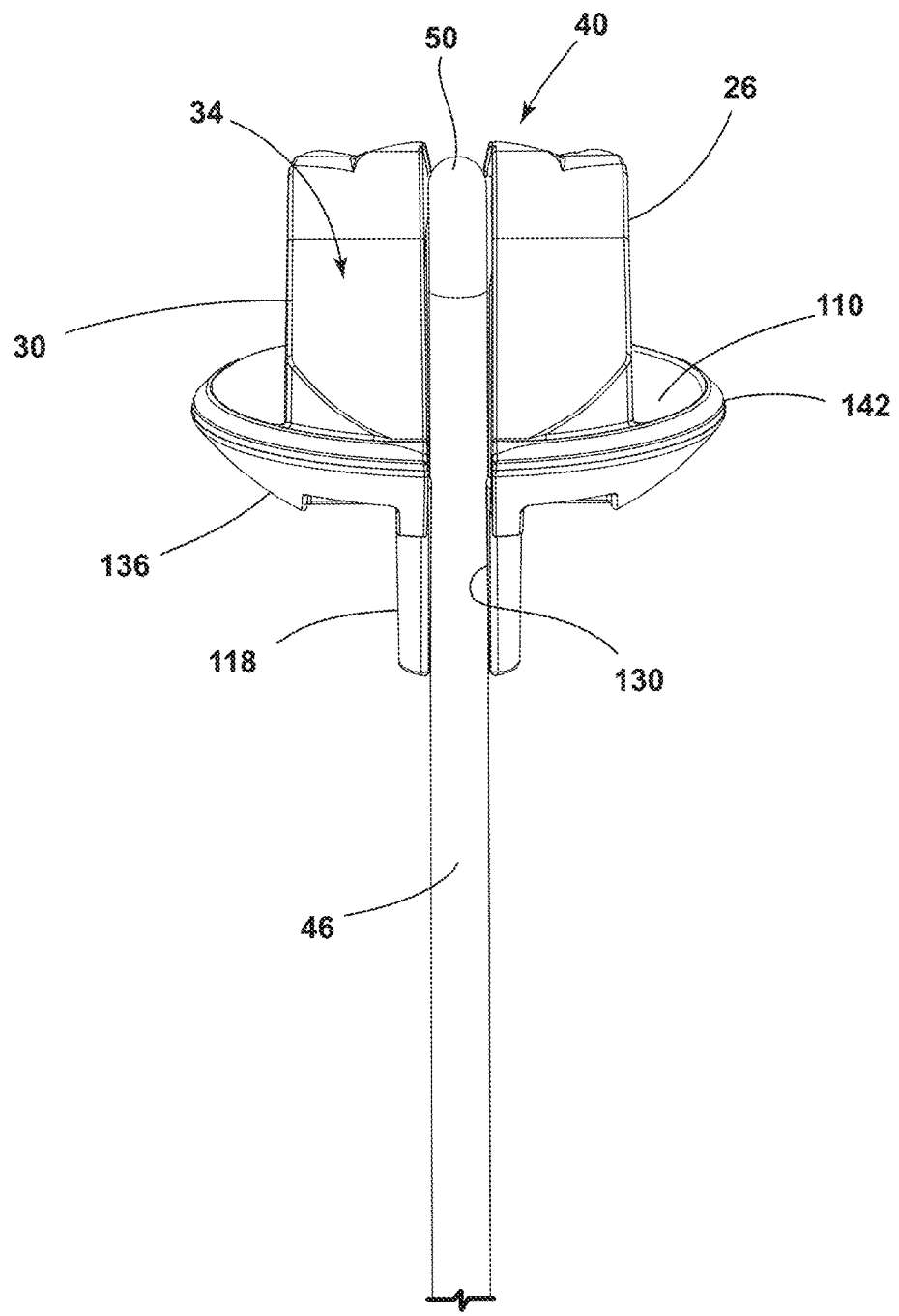
FIG. 4 is a side perspective view of a suspension rod engaged with a suspension support of a laundry appliance suspension system, according to the present disclosure.
Figure 5:
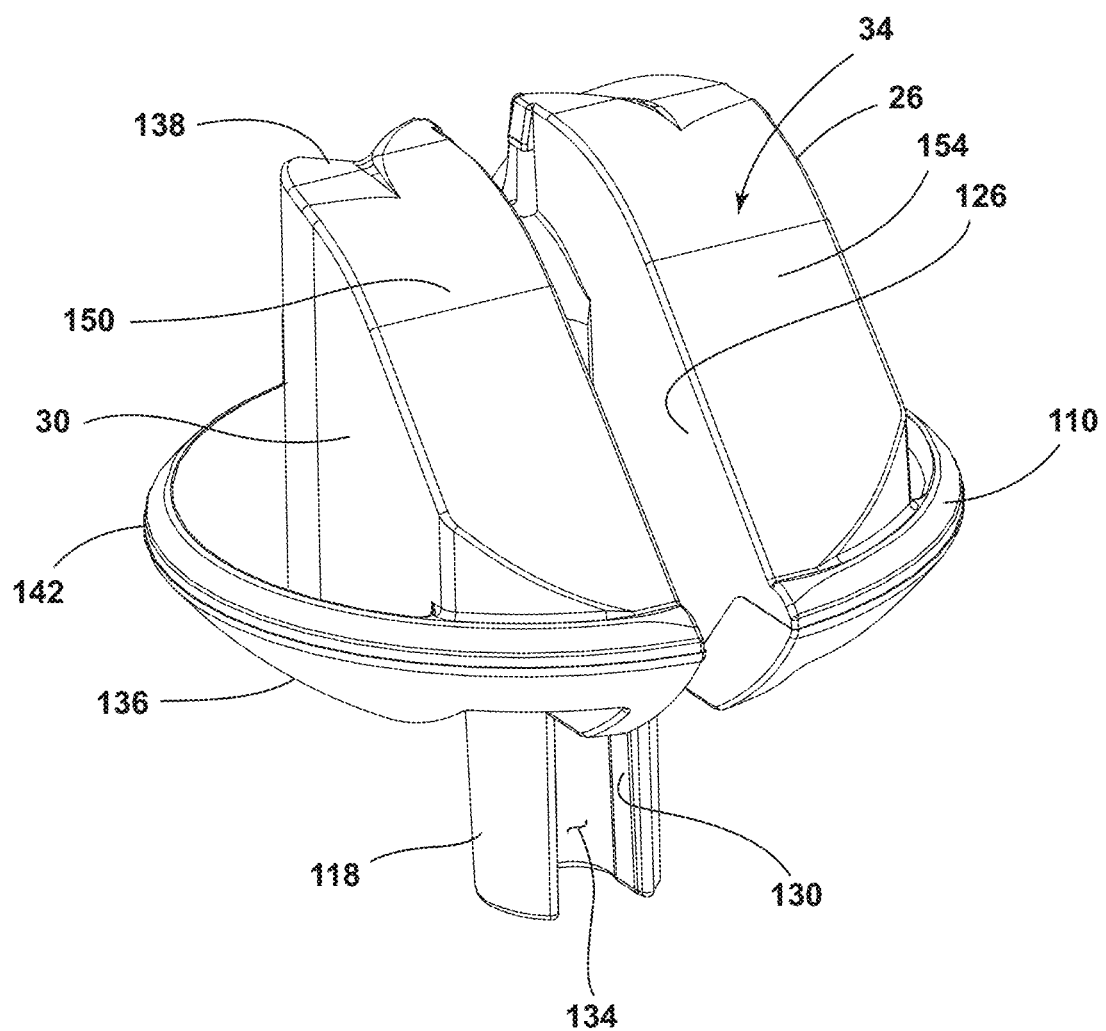
FIG. 5 is a side perspective view of a suspension support of a laundry appliance suspension system, according to the present disclosure.

Referring to FIGS. 3-5, each of the suspension supports 26 includes a base 110 and the engagement portion 30 extending from the base 110. The base 110 engages the corresponding bracket 90 to retain the suspension support 26 on the bracket 90. According to various aspects, each of the brackets 90 may define a depression 114 for supporting the base 110 of the suspension support 26. The depressions 114 may provide additional support for the corresponding suspension supports 26 and may limit movement of the suspension supports 26. Each of the suspension supports 26 typically includes a protrusion 118 extending from the base 110 in an opposite direction of the engagement portion 30. The protrusion 118 can extend through the receiving aperture 18 defined by the bracket 90. When assembled, each of the suspension rods 46 extends through the corresponding protrusion 118, such that the suspension support 26 can provide additional support to the suspension rod 46 and reduce movement of the suspension rod 46.

In various examples, the suspension supports 26 each define a channel 126 that extends through the engagement portion 30 and the base 110. The protrusion 118 of each suspension support 26 typically defines a slot 130 that allows an interior 134 of the protrusion 118 to be in fluid communication with the channel 126 of the same suspension support 26. Stated differently, the protrusion 118 is substantially hollow to accommodate the suspension rod 46. To assemble the suspension rods 46 with the suspension supports 26, each suspension rod 46 can be moved through the channel 126 of the corresponding suspension support 26, through the slot 130, and into the interior 134 of the protrusion 118. The protrusion 118 typically at least partially surrounds the suspension rod 46 when assembled with the suspension support 26. This engagement between the protrusion 118 and the suspension rod 46 can provide additional stability and support to the suspension rod 46. Additionally or alternatively, the protrusion 118 limits movement of the suspension rod 46 when assembled with the suspension support 26. When the suspension supports 26 are assembled with the cabinet frame 14, a rounded bottom surface 136 of the base 110 of each suspension support 26 is typically supported within the depression 114 of the corresponding bracket 90. The protrusion 118 extends through the receiving aperture 18 defined in the depression 114. Each suspension rod 46 extends from the lower portion 106 (FIG. 2) of the tub 22, through the corresponding receiving aperture 18 to couple with the suspension supports 26.

Referring to FIGS. 6-11, the engagement portion 30 of the suspension support 26 includes the ejection surface 34 sloping in the first direction and the assembling surface 38 sloping in the second opposing direction. Each of the ejection surface 34 and the assembling surface 38 slope from an apex 138 toward an outer edge 142 of the base 110. Stated differently, the apex 138 is positioned between the ejection surface 34 and the assembling surface 38. In this way, the ejection surface 34 extends in the first direction from the apex 138 and the assembling surface 38 extends in the second opposing direction from the apex 138.

Figure 6:
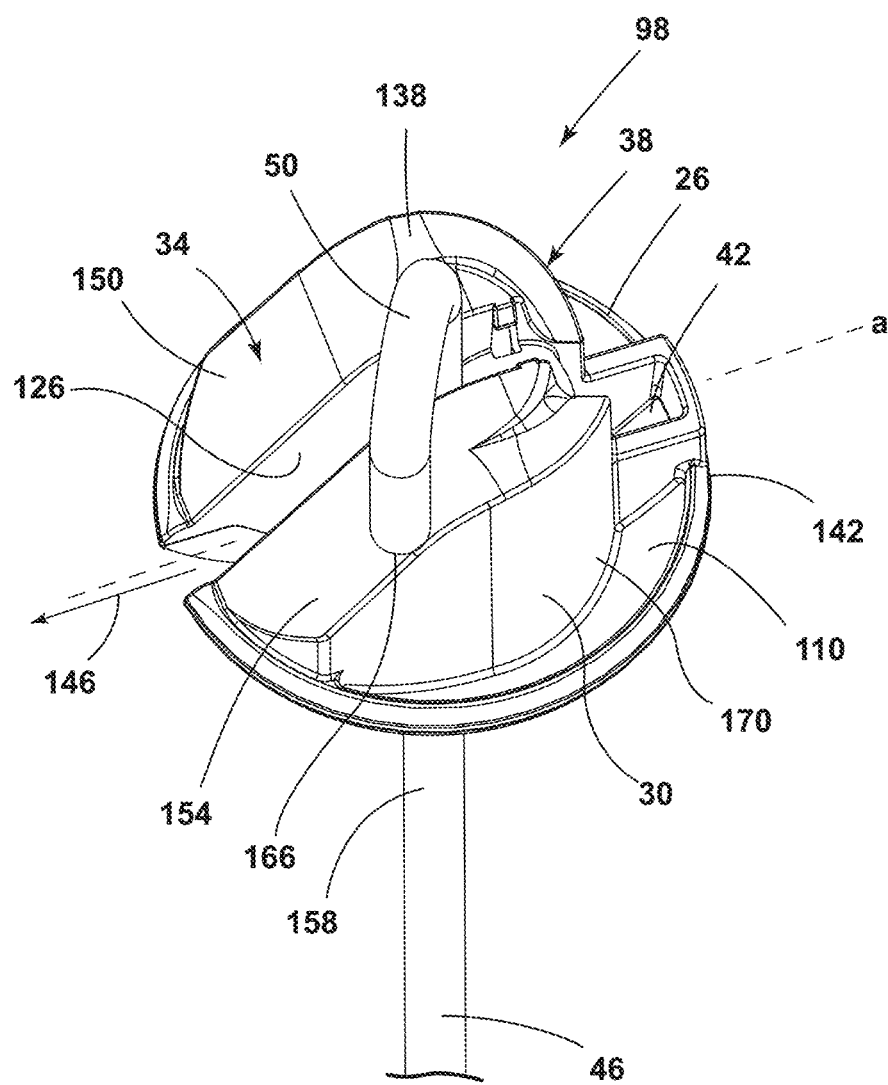
FIG. 6 is a top perspective view of a suspension rod selectively engaging an ejection surface of a suspension support, according to the present disclosure.
Figure 7:
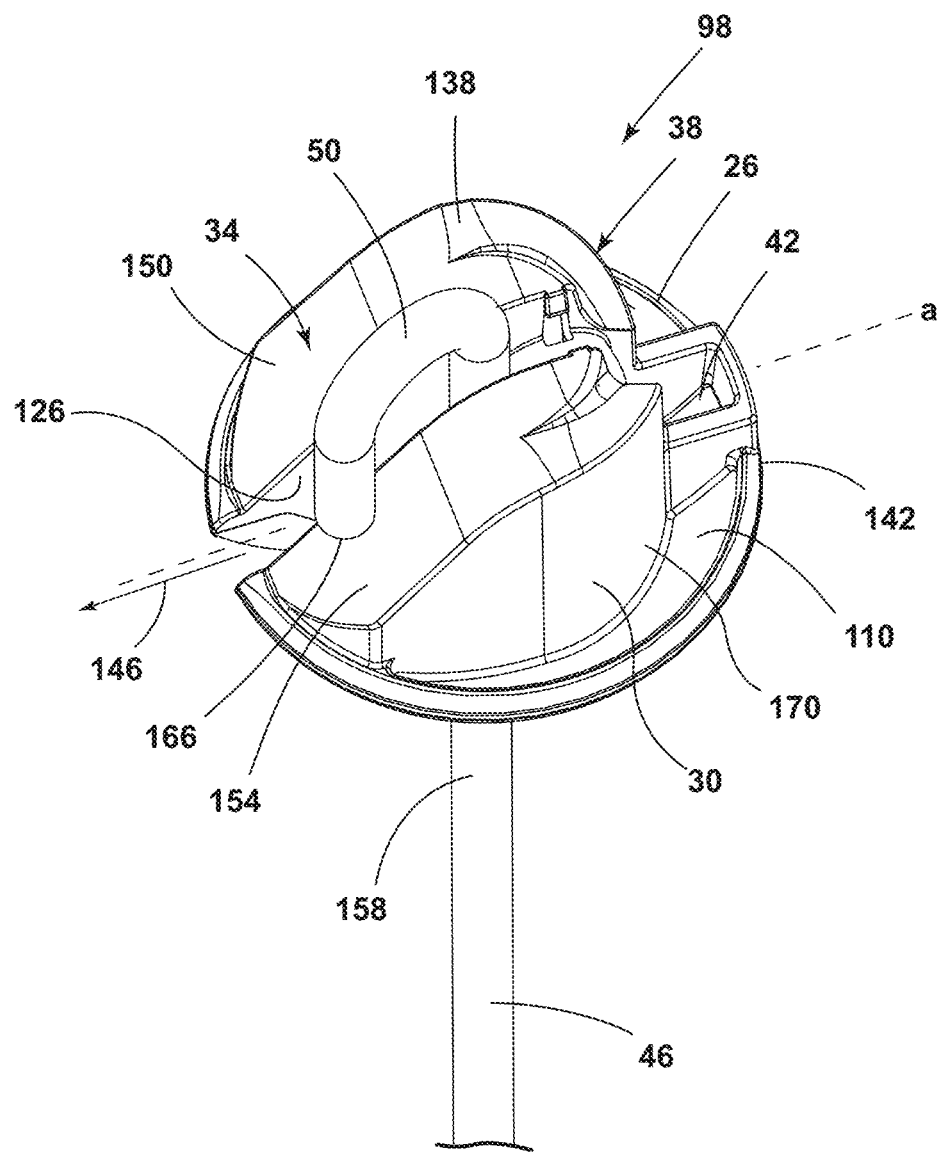
FIG. 7 is a top perspective view of the selective engagement between the suspension rod and the ejection surface of the FIG. 6.
Figure 8:
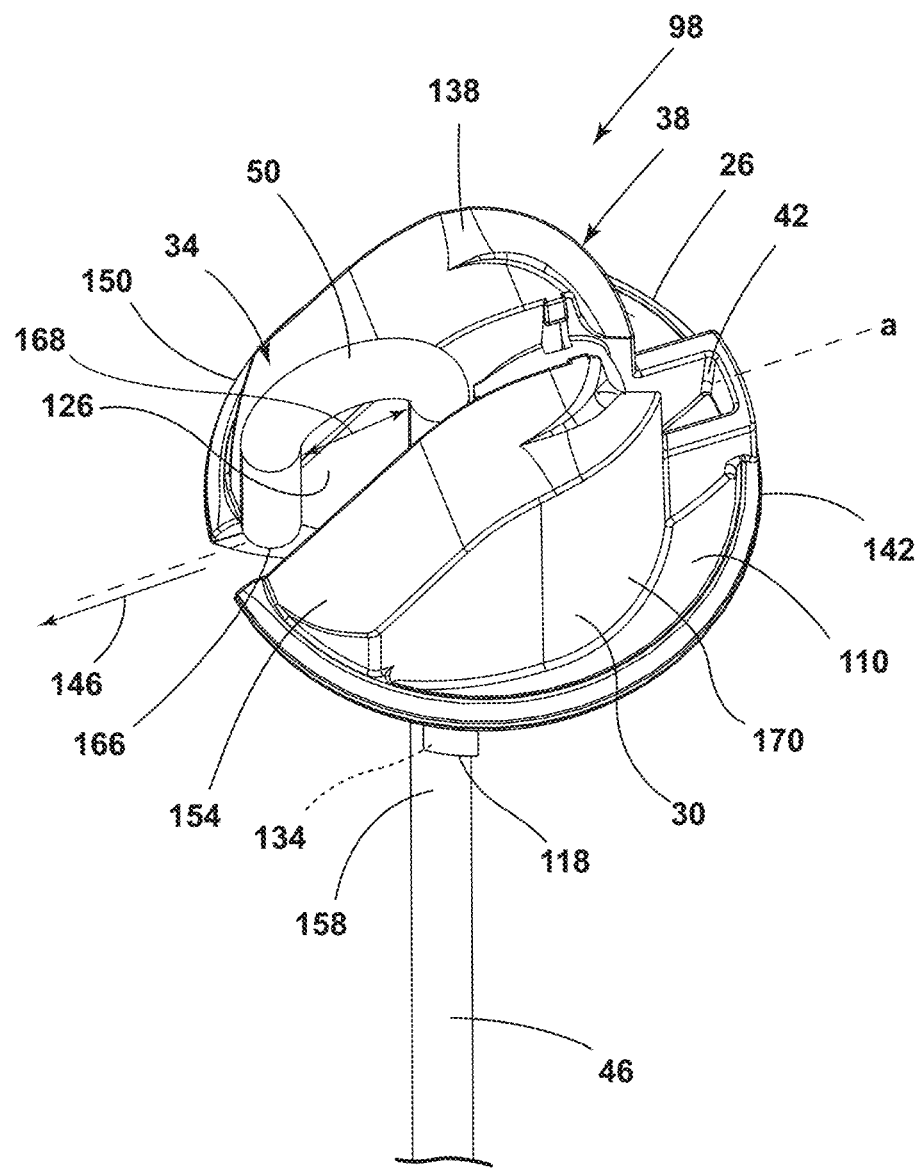
FIG. 8 is a top perspective view of the suspension rod disengaged from the suspension support of FIG. 6.

Referring to FIGS. 6-8, the ejection surface 34 defines a disengaging exit path 146 for disengaging the suspension rod 46 from the suspension support 26 when in the misaligned position. The ejection surface 34 may be a substantially smooth, angled surface, such that the ejection surface 34 slopes in a substantially consistent manner from the apex 138 to the outer edge 142. According to various aspects, the channel 126 at least partially defines the disengaging exit path 146. The disengaging exit path 146 and the channel 126 are defined along a central axis a of the engagement portion 30 of the suspension support 26. In various examples, the ejection surface 34 is divided by the channel 126 into first and second ejection portions 150, 154. The first and second ejection portions 150, 154 are substantially mirror images of one another relative to the central axis a.

Each of the suspension rods 46 includes a substantially linear portion 158 that extends through the corresponding channel 126. Additionally, each of the suspension rods 46 defines the hook 50 in an end portion thereof. An end 166 of each hook 50 selectively engages one of the ejection surface 34 or the assembling surface 38. As illustrated in FIGS. 6-8, the end 166 of the hook 50 selectively engages the ejection surface 34 when in the misaligned position. When the hook 50 selectively engages the ejection surface 34, the hook 50 is configured to slide along the ejection surface 34 to the disengaging exit path 146 to disengage from the suspension support 26. A slope angle of the ejection surface 34 along with a gravitational pulling force applied to the suspension rod 46 by a weight of the tub 22 (FIG. 2) operates to move the suspension rod 46 along the disengaging exit path 146 to completely disengage from the suspension support 26. In this way, if the suspension rod 46 is in the misaligned position relative to the suspension support 26, the suspension rod 46 can automatically disengage from the suspension support 26. Moreover, during manufacturing and assembling, the ejection surface 34 provides for a substantially immediate visual and also auditory and tactile feedback of misalignment of the suspension rod 46, which may be advantageous for preventing a misaligned suspension system 98 from proceeding through the assembly process.

When the suspension rod 46 is misaligned with the suspension support 26, the end 166 of the hook 50 can move from a position proximate the apex 138, as illustrated in FIG. 6, along the ejection surface 34 and toward the outer edge 142, as illustrated in FIG. 7. In various examples, the suspension rod 46 may rotate as the hook 50 travels along the disengaging exit path 146. In such examples, the hook 50 disengages from the suspension support 26 while the suspension rod 46 is disposed within the channel 126. In a non-limiting example, the linear portion 158 can remain within the interior 134 of the protrusion 118 (FIG. 8) until the hook 50 disengages from the suspension support 26. In an additional or alternative non-limiting example, as the hook 50 slides along the ejection surface 34, the linear portion 158 may move out of the protrusion 118 and through an outer portion of the channel 126.

Once the hook 50 disengages from the ejection surface 34, the suspension rod 46 is completely disengaged from the suspension support 26. In this way, the suspension rod 46 can fall away from the suspension support 26 due to the force of gravity. According to various aspects, each of the first and second ejection portions 150, 154 may have a thickness greater than a space 168 defined by the hook 50 between the linear portion 158 and the end 166. In this way, the hook 50 cannot extend over either of the first and second ejection portions 150, 154 to be retained in the misaligned position. The space defined by the hook 50 is sufficient to secure the suspension rod 46 in the installed position 40 (FIG. 4), but is not wide enough to retain the suspension rod 46 in the misaligned position over one of the first and second ejection portions 150, 154. As such, the end 166 can engage the ejection surface 34, and typically, cannot slide to engage an outer surface 170 of the engagement portion 30.

Figure 9:
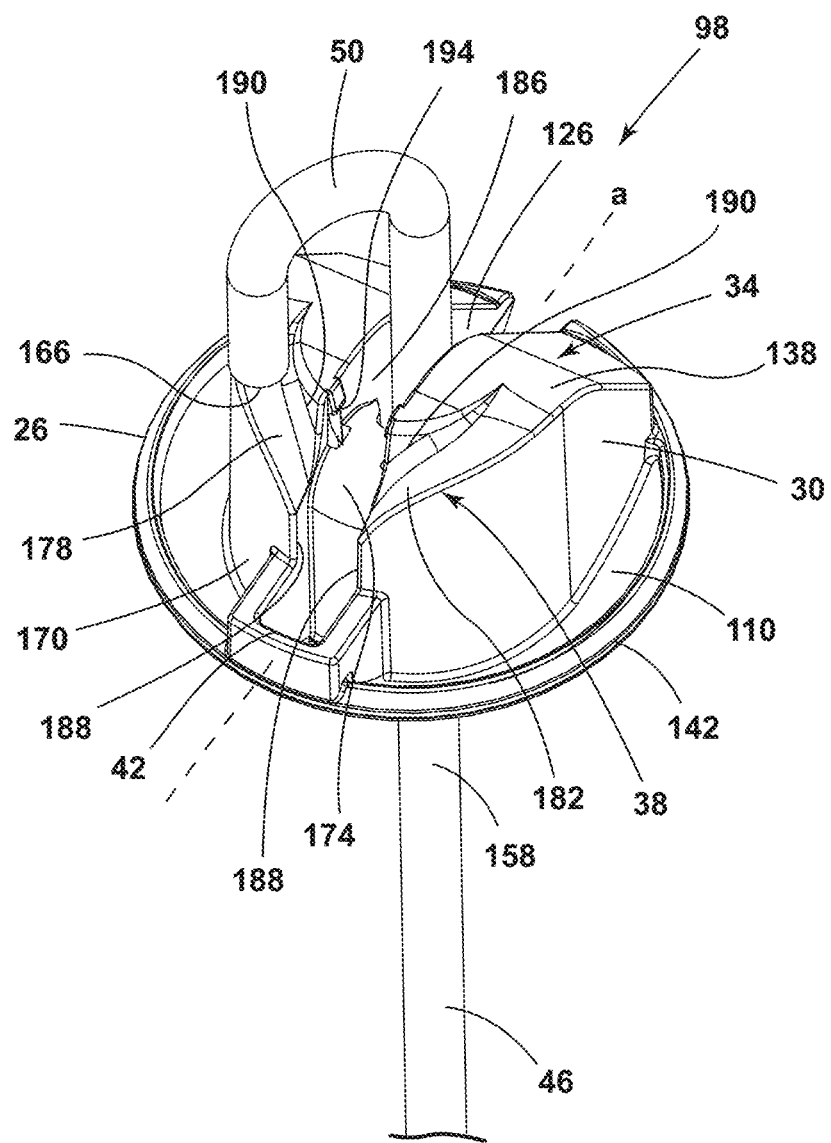
FIG. 9 is a top perspective view of a suspension rod selectively engaging an assembling surface of a suspension support, according to the present disclosure.
Figure 10:
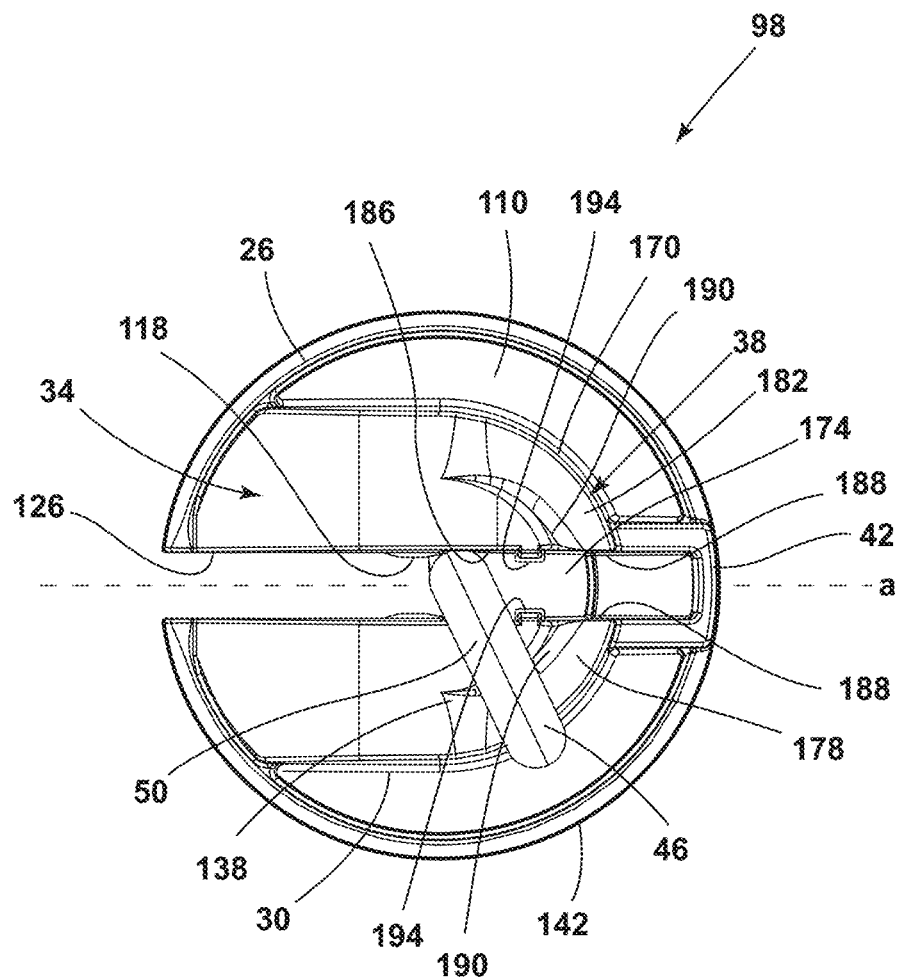
FIG. 10 is a top plan view of the selective engagement between the suspension rod and the assembling surface of FIG. 9.
Figure 11:
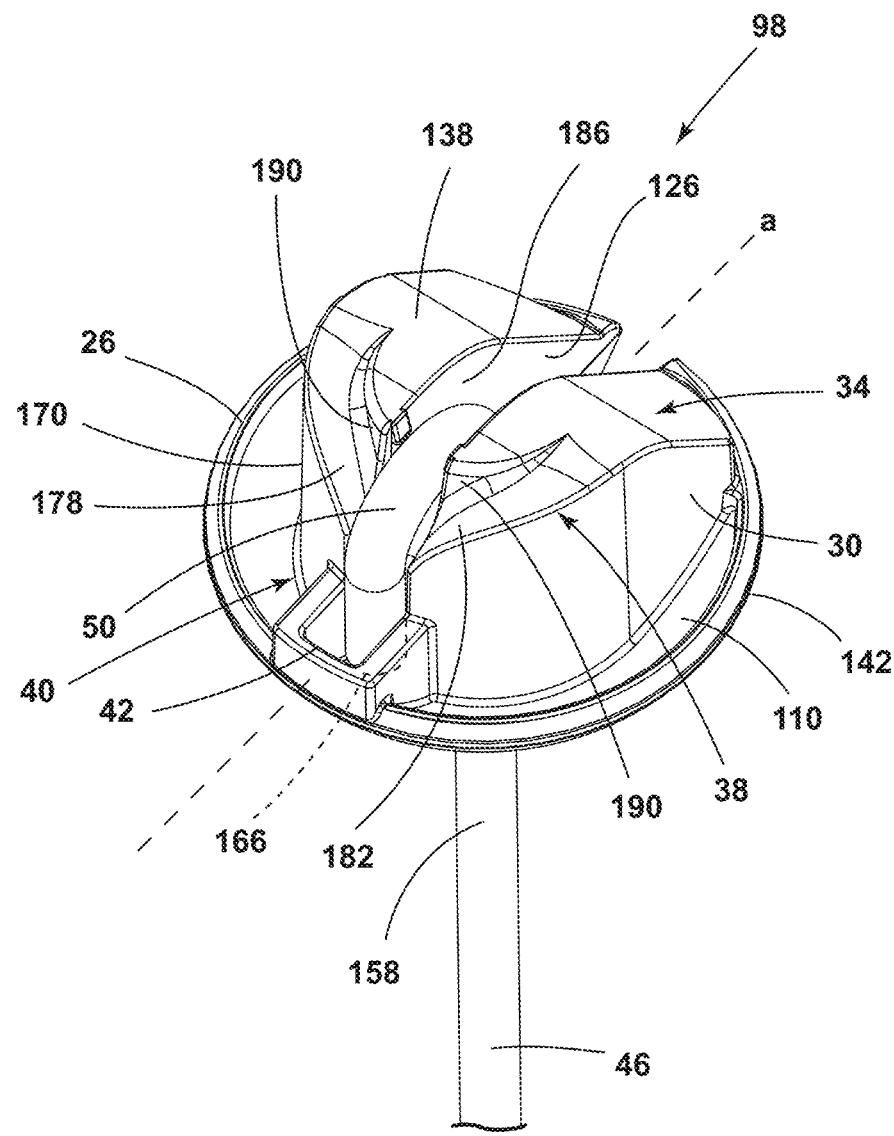
FIG. 11 is a top perspective view of the suspension rod engaged with the suspension support of FIG. 9 in an installed position.

Referring to FIGS. 9-11, the assembling surface 38 defines a retaining path for securing the suspension rod 46 with the suspension support 26 in the installed position 40, which is best illustrated in FIG. 11. In various examples, the assembling surface 38 is divided by a retention feature 174 into a first assembling portion 178 and a second assembling portion 182. The first and second assembling portions 178, 182 are mirror images of one another across the central axis a. The first and second assembling portions 178, 182 may have a lesser thickness than the first and second ejection portions 150, 154 (FIG. 6). However, the thickness of the first and second assembling portions 178, 182 can be greater than a space defined by the hook 50 to prevent the hook 50 from engaging the outer surface 170 of the engagement portion 30 and being retained in the misaligned position.

Referring again to FIGS. 9-11, the first and second assembling portions 178, 182 can slope inward toward one another and away from the first and second ejection portions 150, 154. In this way, the first and second assembling portions 178, 182 slope toward the central axis a of the engagement portion 30. The first and second assembling portions 178, 182 can be disposed proximate the outer surface 170 of the engagement portion 30 and spaced-apart from inner surfaces 186 defined by the channel 126. The engagement portion 30 typically defines guide walls 190 between each of the first and second assembling portions 178, 182 and the inner surfaces 186. Additionally or alternatively, the engagement portion 30 defines a sidewall 188 proximate each of the first and second assembling portions 178, 182. The sidewalls 188 are disposed between the corresponding first and second assembling portions 178, 182. Moreover, the sidewalls 188 are defined by the inner surfaces 186 defined by the channel 126. The first and second assembling portions 178, 182 and the corresponding guide walls 190 promote movement of the hook 50 toward the retaining notch 42.

In various examples, the retaining notch 42 is defined by at least one of the base 110 and the engagement portion 30 of the suspension support 26. The retaining notch 42 operates to engage the end 166 of the hook 50 of the suspension rod 46 to promote a locking engagement of the suspension rod 46 in the installed position 40. In various examples, the retaining notch 42 is disposed along the central axis a of the suspension support 26. The retaining notch 42 is disposed proximate the retention feature 174. In various examples, both the retaining notch 42 and the retention feature 174 are disposed along the central axis a of the suspension support 26. The retention feature 174 typically defines a shape corresponding with the shape of the hook 50. The hook 50 rests on the retention feature 174 when the end 166 is disposed within the retaining notch 42. Stated differently, the hook 50 is disposed on the retention feature 174 when the suspension rod 46 is in the installed position 40.

Referring still to FIGS. 9-11, the retention feature 174 is offset from the assembling surface 38. As illustrated, the retention feature 174 is vertically offset from the assembling surface 38. According to various aspects, projections 194 extend from the inner surfaces 186 toward the central axis a. The projections 194 extend from the assembling surface 38 toward the retention feature 174. The projections 194 narrow the space for the hook 50 of the suspension rod 46. In this way, the projections 194 can reduce and/or limit lateral and vertical movement of the hook 50 when the hook 50 is disposed on the retention feature 174 to lockably engage the suspension rod 46 with the suspension support 26.

When the hook 50 of the suspension rod 46 is positioned between the apex 138 and the retaining notch 42, the assembling surface 38 guides the hook 50 to the installed position 40. The end 166 of the hook 50 can engage the assembling surface 38 proximate the apex 138. The suspension rod 46 slidably engages the assembling surface 38. Because of the weight of the tub 22 (FIG. 2), the suspension rod 46 and the hook 50 are pulled downward to automatically move the suspension rod 46 to the installed position 40. The weight of the tub 22 (FIG. 2) provides a gravitational pulling force on the suspension rod 46 to promote the sliding engagement of the hook 50 with the suspension support 26. The hook 50 can move from proximate the apex 138, as illustrated in FIG. 9, toward the central axis a until the hook 50 is disposed on the retention feature 174 and the end 166 is disposed in the retaining notch 42, as illustrated in FIG. 11.

As best illustrated in FIGS. 9 and 10, the channel 126, the retention feature 174, and the retaining notch 42 are disposed along the central axis a of the suspension support 26. During installation, the suspension rod 46 can be inserted into the channel 126 until the suspension rod 46 abuts the retention feature 174. The interface between the retention feature 174 and the channel 126 is centrally located in the suspension support 26. Additionally or alternatively, the interface between the channel 126 and the retention feature 174 generally aligns with the apex 138. In various examples, the ejection surface 34 can extend a longer distance to the outer edge 142 compared to the assembling surface 38. The ejection surface 34 extends to the outer edge 142 to promote complete disengagement of the suspension rod 46 from the suspension support 26. The assembling surface 38 extends toward the outer edge 142, but is spaced-apart from the outer edge 142 by the retaining notch 42. In this way, the linear portion 158 of the suspension rod 46 may be centrally located relative to the suspension support 26 when in the installed position 40. This configuration may provide for increased balance of the suspension system 98.

Figure 12:
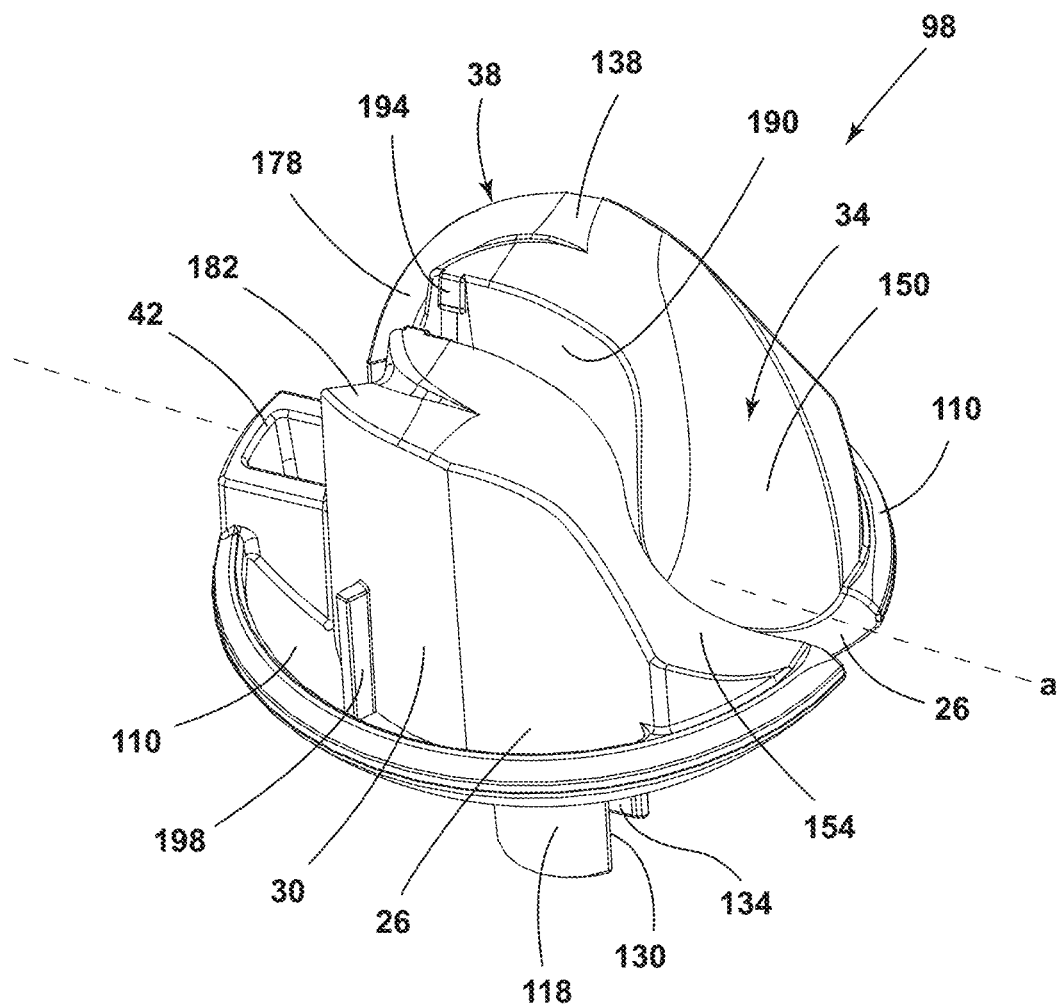
FIG. 12 is a side perspective view of a suspension support of a laundry appliance suspension system, according to the present disclosure.

Referring to FIGS. 3 and 12, an additional or alternative non-limiting example of the suspension support 26 is illustrated. The ejection surface 34 can have a different configuration that promotes and increases speed and consistency of the suspension rod 46 sliding along the ejection surface 34. The first and second ejection portions 150, 154 can slope inward toward one another. In this way, the first and second ejection portions 150, 154 can include a multi-part slide that slopes away from the apex 138 and also slopes inward toward the central axis a. The ejection surface 34 of FIG. 12 can define an increased slope angle relative to the configuration as illustrated in FIGS. 6-11. Additionally, the ejection surface 34 of FIG. 12 can promote rotation of the hook 50. As the hook 50 slides along the ejection surface 34 toward disengaging exit path 146, the suspension rod 46 and the hook 50 can rotate. In this way, the ejection surface 34 can promote axial movement of the suspension rod 46, as well as rotation of the hook 50.

In operation, the suspension rods 46 remain within the corresponding protrusion 118 until the hook 50 disengages from the suspension support 26, or alternatively, the suspension rods 46 can move out of the protrusion 118 as the hook 50 slides along the disengaging exit path 146. Additionally or alternatively, the suspension rod 46 can include at least one rib 198 extending between the outer surface 170 of the engagement portion 30 and the outer edge 142 of the base 110. The rib 198 prevents gas bubbles from being trapped during the manufacture of the suspension support 26 through an injection molding process. Moreover, the rib 198 can provide additional strength to the suspension support 26 when supporting the weight of the tub 22 (FIG. 2).

Referring to FIGS. 6 and 10, the suspension rod 46 is configured to pivot about a central location of the suspension support 26 whether the hook 50 engages the ejection surface 34 or the assembling surface 38. During installation, the suspension rod 46 is inserted into the channel 126 and into the interior 134 of the protrusion 118. The protrusion 118 typically operates to hold the linear portion 158 of the suspension rod 46 adjacent to the retention feature 74. In this way, the protrusion 118 locks the suspension rod 46 against the retention feature 174 and the pivot is created therebetween to promote movement to one of the installed position 40 and rotation through the disengaging exit path 146. The suspension rod 46 can rotate about a pivot point as the hook 50 slidably engages one of the ejection surface 34 and the assembling surface 38. The pivot point is defined between the retention feature 174 and the protrusion 118. The pivoting engagement between the suspension rod 46, the protrusion 118, and the retention feature 174 substantially prevents movement of lateral and vertical movement of the suspension rod 46.

Referring again to FIG. 10, the channel 126 divides the suspension support 26, including the ejection surface 34 and the assembling surface 38. The channel 126 extends between opposing outer edges 142 of the suspension support 26. In this way, the channel 126 extends from the disengaging exit path 146 to the retention feature 42. The channel 126 typically defines the first and second ejection portions 150, 154 and the first and second assembling portions 178, 182. Additionally, the channel 126 defines the inner surfaces 186, the interior 134 of the protrusion 118, the retention feature 174, the projections 194, the sidewalls 188, and the retention notch 42. The channel 126 provides for the installation of the suspension rod 46 with the suspension support 26 by defining the assembling surface 38 and various features for creating a locking engagement. Further, the channel 126 allows for the complete disengagement of the suspension rod 46 from the suspension support 26 through the ejection surface 34 and the disengaging exit path 146.

Referring to FIGS. 1-12, the suspension support 26 operates to realign the suspension rod 46 when the suspension rod 46 is in the misaligned position. When the end 166 selectively engages one of the ejection surface 34 and the assembling surface 38, the weight of the tub 22 operates to pull on the suspension rod 46 by the force of gravity, which causes the end 166 to slidably engage the suspension support 26. When the end 166 of the hook 50 selectively engages the ejection surface 34, the suspension rod 46 slides along the ejection surface 34 to the disengaging exit path 146. The hook 50 continues to slide along the ejection surface 34 until the hook 50, and therefore, the suspension rod 46 completely disengages from the suspension support 26. When the end 166 of the hook 50 selectively engages the assembling surface 38, the suspension rod 46 can be pulled by the weight of the tub 22 (i.e., force of gravity), which can cause the end 166 to slide along the assembling surface 38. The suspension rod 46 will continue to slide along the assembling surface 38 until the hook 50 is disposed on the retention feature 174 and the end 166 is disposed within the retaining notch 42 in the installed position 40. The suspension rod 46 is then secured to the suspension support 26 to support the tub 22 within the cabinet 54.

Use of the present device provides for a variety of advantages. For example, the ejection surface 34 can promote movement of the suspension rod 46 along the disengaging exit path 146 to completely disengage the suspension rod 46 from the suspension support 26. Additionally, the assembling surface 38 can promote movement of the suspension rod 46 from the misaligned position to the installed position 40 where the suspension rod 46 is lockably engaged with the suspension support 26. Moreover, misalignment of the suspension rod 46 and the suspension support 26 can be quickly identified during the assembly of the laundry appliance 10. The misalignment can result in disengagement of the suspension rod 46 from the suspension support 26, or alternatively, can result in realignment of the suspension rod 46 into the installed position 40 based on the selective engagement of the hook 50 and suspension support 26. Moreover, the suspension support 26 having the ejection surface 34 and the assembling surface 38 can prevent improperly assembled suspension systems 98 from proceeding along the assembly line. The misalignment can be identified almost instantaneously and can be properly aligned before the suspension system 98 proceeds along the assembly line. As such, the suspension support 26 can increase the efficiency of the manufacturing process, while decreasing manufacturing costs due to misalignment. Further, the suspension rod 46 can be installed properly if the hook 50 is within a rotational range of about 180°. This produces a greater margin or tolerance for workers assembling the laundry appliance 10. Additional benefits or advantages of using this device may also be realized and/or achieved.

According to an aspect of the present disclosure, a laundry appliance includes a cabinet frame that defines a receiving aperture. A tub is disposed within the cabinet frame. A suspension support includes an engagement portion. The engagement portion includes an ejection surface sloping in a first direction and an assembling surface sloping in a second opposing direction to a retaining notch. A suspension rod extends between the tub and the suspension support and has a hook for selectively engaging the assembling surface in an installed position and selectively engaging the ejection surface in a misaligned position.

According to another aspect, an ejection surface defines a disengaging exit path for disengaging a suspension rod from a suspension support in a misaligned position.

According to another aspect, an assembling surface defines a retaining path for securing a suspension rod with a suspension support in an installed position.

According to another aspect, a suspension support defines a retaining notch along a retaining path that engages an end of a hook.

According to another aspect, an assembling surface is divided by a retention feature into a first assembling portion and a second assembling portion.

According to another aspect, first and second assembling portions slope toward a central axis of a suspension support.

According to another aspect of the present disclosure, a suspension system for a laundry appliance includes a suspension rod having a hook with an end. A suspension support has an ejection surface sloping in a first direction to a disengaging exit path and an assembling surface sloping in a second opposing direction to a retaining notch. When the hook engages the ejection surface, the hook is configured to slide along the ejection surface to the disengaging exit path and when the hook engages the assembling surface, the hook is configured to slide along the assembling surface to position the end of the hook in the retaining notch.

According to another aspect, an ejection surface is divided into a first ejection portion and a second ejection portion by a channel that defines a disengaging exit path. The first and second ejection portions slope inward toward one another.

According to another aspect, a retaining notch and a disengaging exit path are disposed along a central axis of a suspension support.

According to another aspect, an assembling surface is divided by a retention feature offset from an assembling surface.

According to another aspect, a hook is disposed on a retention feature when an end is disposed in a retaining notch.

According to another aspect, an assembling surface is divided into first and second assembling portions sloping inward toward one another.

According to another aspect, a suspension rod is in a misaligned position when a hook selectively engages an ejection surface.

According to still another aspect, a suspension rod slidably engages an assembling surface to automatically move a suspension rod to an installed position.

According to another aspect of the present disclosure, a suspension support includes a base. An engagement portion includes an ejection surface sloping in a first direction. The ejection surface is divided by a channel that defines a disengaging exit path. An engagement portion includes an assembling surface sloping in a second opposing direction. The assembling surface is divided by a retention feature. A retaining notch is defined by at least one of the base and the engagement portion proximate the retention feature.

According to another aspect, a disengaging exit path and a retaining notch are disposed along a central axis of the engagement portion.

According to another aspect, a retention feature divides an assembling surface into a first assembling portion and a second assembling portion. The first and second assembling portions slope inward toward a central axis.

According to another aspect, a disengaging exit path extends through a base.

According to another aspect, an assembling surface extends from an apex of an engagement portion to a retaining notch.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A laundry appliance, comprising:
a cabinet frame defining a receiving aperture;
a tub disposed within the cabinet frame;
a suspension support including an engagement portion, wherein the engagement portion includes an ejection surface sloping in a first direction and an assembling surface sloping in a second opposing direction to a retaining notch; and a suspension rod extending between the tub and the suspension support and having a linear portion and a hook for selectively engaging the assembling surface in an installed position and selectively engaging the ejection surface in a misaligned position, wherein the engagement portion has a thickness greater than a distance between the linear portion and an end of the hook to promote a sliding engagement with an end of the hook to direct the suspension rod to at least one of the installed position and the misaligned position.

2. The laundry appliance of claim 1, wherein the ejection surface defines a disengaging exit path for disengaging the suspension rod from the suspension support in the misaligned position.

3. The laundry appliance of claim 1, wherein the assembling surface defines a retaining path for securing the suspension rod with the suspension support in the installed position.

4. The laundry appliance of claim 3, wherein the suspension support defines the retaining notch along the retaining path that engages the end of the hook.

5. The laundry appliance of claim 1, wherein the assembling surface is divided by a retention feature into a first assembling portion and a second assembling portion.

6. The laundry appliance of claim 5, wherein the first and second assembling portions slope toward a central axis of the suspension support.

7. The laundry appliance of claim 5, wherein the retention feature is offset from the first and second assembling portions.

8. A suspension system for a laundry appliance, comprising:
a suspension rod including a hook having an end; and
a suspension support including an engagement portion having an ejection surface sloping in a first direction to a disengaging exit path and an assembling surface sloping in a second opposing direction to a retaining notch, wherein a thickness of the engagement portion is greater than a distance between a linear portion of the suspension rod and the end of the hook to promote movement of the hook such that when the hook engages the ejection surface the hook is configured to slide along the ejection surface to the disengaging exit path and when the hook engages the assembling surface the hook is configured to slide along the assembling surface to position the end of the hook in the retaining notch.

9. The suspension system of claim 8, wherein the ejection surface is divided into a first ejection portion and a second ejection portion by a channel that defines the disengaging exit path, and wherein the first and second ejection portions slope inward toward one another.

10. The suspension system of claim 9, wherein the retaining notch and the disengaging exit path are disposed along a central axis of the suspension support.

11. The suspension system of claim 8, wherein the assembling surface is divided by a retention feature offset from the assembling surface.

12. The suspension system of claim 11, wherein the hook is disposed on the retention feature when the end is disposed in the retaining notch.

13. The suspension system of claim 11, wherein the assembling surface is divided into first and second assembling portions sloping inward toward one another.

14. The suspension system of claim 8, wherein the suspension rod is in a misaligned position when the hook selectively engages the ejection surface.

15. The suspension system of claim 8, wherein the suspension rod slidably engages the assembling surface to automatically move the suspension rod to an installed position.

16. A suspension support, comprising:
a base; and
an engagement portion configured to promote movement of a suspension rod hook along the engagement portion by having a thickness greater than a distance between a linear portion of a suspension rod and the end of the suspension rod hook, wherein the engagement portion includes:
an ejection surface sloping in a first direction, wherein the ejection surface is divided by a channel defining a disengaging exit path;
an assembling surface sloping in a second opposing direction, wherein the assembling surface is divided by a retention feature; and
a retaining notch defined by at least one of the base and the engagement portion proximate the retention feature.

17. The suspension support of claim 16, wherein the disengaging exit path and the retaining notch are disposed along a central axis of the engagement portion.

18. The suspension support of claim 17, wherein the retention feature divides the assembling surface into a first assembling portion and a second assembling portion, and wherein the first and second assembling portions slope inward toward the central axis.

19. The suspension support of claim 16, wherein the disengaging exit path extends through the base.

20. The suspension support of claim 16, wherein the assembling surface extends from an apex of the engagement portion to the retaining notch.

* * * * *